3,478,063
PRODUCTION OF MALEIC ANHYDRIDE BY CATALYTIC OXIDATION OF OLEFINICALLY UNSATURATED C₄-HYDROCARBONS

Wilhelm Friedrichsen and Guenter Poehler, Ludwigshafen (Rhine), and Otto Goehre, Wilhelmsfeld, Germany, assignors to Badische Anilin- & Soda-Fabrik Aktiengesellschaft, Ludwigshafen (Rhine), Germany
No Drawing. Filed Oct. 4, 1966, Ser. No. 584,105
Claims priority, application Germany, Oct. 9, 1965, 1,518,603
Int. Cl. C07c $57/14$
U.S. Cl. 260—346.8          9 Claims

ABSTRACT OF THE DISCLOSURE

Process for the production of maleic anhydride by oxidation of an olefinically unsaturated hydrocarbon in the gas phase at 300–500° C. with an oxygen-containing gas while using as the essential oxidation catalyst in contact with the gaseous reaction mixture a specific vanadium oxide/phosphoric acid catalyst containing at least one other oxide of chromium, iron, cobalt or nickel, preferably on an inert carrier such as titanium dioxide, the molar amount of $P_2O_5$ being at least equal to twice that of the $V_2O_5$ and equal to once or more than that of the other oxide.

---

It is known that dicarboxylic anhydrides can be prepared by catalytic oxidation of certain hydrocarbons with gases containing oxygen, particularly with air, at temperatures of 250° to 550° C. The catalyst may be stationary in the oxidation chamber or may be fluidized. Oxides and salts of vanadium, molybdenum, tungsten, as well as oxides and salts of other elements of Groups 5 and 6 of the Periodic System, which may be applied to carriers, such as aluminum oxide or silicates, have mainly been used as catalysts. These catalysts are preferably used for the oxidation of aromatic compounds, such as naphthalene, o-xylene and benzene. In the oxidation of olefinic compounds to dicarboxylic acids or their anhydrides, particularly of n-butenes or butadiene to maleic anhydride, however, only low yields are obtained with these conventional catalysts.

A catalyst containing vanadium pentoxide and phosphorus pentoxide in a molar ratio of from 1:2 to 3:2 on a catalyst carrier having a small internal surface area has been recommended in French patent specification No. 1,382,523 for the oxidation of unsaturated C₄-hydrocarbons. The yields of maleic anhydride are only satisfactory when pure butadiene is used as starting material and when the gas containing oxygen is laden with only small amounts of hydrocarbon.

For the oxidation of C₄-hydrocarbons, U.S. patent specification No. 3,221,049 recommends the use of a tubular reactor in which at least two layers of catalysts having different degrees of activity are provided, the catalysts used advantageously being vanadium pentoxide and phosphoric acid on an inert carrier material. Satisfactory yields of maleic anhydride are only obtained in this case when pure butene-(1) or a technical mixture of C₄-hydrocarbons having a high content of isobutylene is used. Although these catalysts retain undiminished activity over a long period, their composition must be constantly checked because the catalyst continuously looses small amounts of phosphoric acid. To ensure activity over a long period, it is necessary to replenish losses of phosphoric acid continuously. Moreover the reaction products obtained are strongly discolored and must be subjected to a special purification operation.

Catalysts containing vanadium pentoxide and phosphorus pentoxide for the production of maleic anhydride are described in U.S. patent specifications Nos. 3,156,705, 3,156,706 and 3,156,707. It is preferred to maintain an atomic ratio of vanadium to phosphorus of from 1:1 to 1:1.6 and to add to the catalysts a phosphorus stabilizer in amounts of 0.05 to 5% by weight (on the total vanadium and phosphorus compounds). The yields obtained with these catalysts are however unsatisfactory.

It is an object of the present invention to provide a process for the production of maleic anhydride by oxidation of olefinically unsaturated C₄-hydrocarbons in which the gas containing oxygen can be laden with a large amount of hydrocarbon, in which excellent yields are obtained not only when using pure hydrocarbons but also with technical mixtures of hydrocarbons. It is a further object of the invention to provide a process for the production of maleic anhydride from olefinically unsaturated C₄-hydrocarbons in which it is not necessary to use a hydrocarbon mixture having a high content of isobutylene in order to achieve high yields. Another object of the invention is to provide a process for the production of maleic anhydride in which the catalysts used exhibit undiminished activity over a long period and do not continuously loose phosphoric acid, which would result in discolored reaction products difficult to purify.

These and other objects are achieved in a process for the production of maleic anhydride from olefinically unsaturated aliphatic hydrocarbons having four carbon atoms in the linear molecular chain by oxidation in the gas phase with oxygen or gas containing free oxygen at temperatures of 300° to 500° C. using vanadium pentoxide/phosphoric acid catalysts which contain 1 to 30%, preferably 2 to 20%, by weight of $V_2O_5$, 5 to 70%, preferably 10 to 60%, by weight of $P_2O_5$ and 4 to 90%, preferably 4 to 60%, by weight of at least one oxide of the metals copper, silver, chromium, manganese, iron, cobalt and nickel and if desired up to 25%, preferably up to 10%, by weight of $WO_3$ and up to 90%, preferably up to 75%, by weight of an inert catalyst carrier material.

The new process has a number of advantages. Maleic anhydride is formed in a high yield. High yields are also obtained particularly when the starting material is not pure butadiene or pure butene-(1), but when technical mixtures are used. It is by no means necessary to use mixtures having a high isobutylene content. The catalysts have high stability and retain undiminished activity over long periods of operation. The phosphorus content of the catalysts need not be adjusted for long periods of operation. The reaction products obtained are not strongly discolored and are free from phosphoric acid. The new process permits high throughputs and a high degree of loading of the oxygen-containing gas.

Olefinically unsaturated aliphatic hydrocarbons having four carbon atoms in a linear molecular chain, particularly n-butenes and butadiene, are suitable starting materials. It is preferred not to use pure substances but technical hydrocarbon fractions having a high content of butene and/or butadiene. For example C₄-fractions having a content of 5 to 95% of n-butenes and 1 to 95% of butadiene, the mixture, if desired, containing 1 to 50% of n-butane, isobutane or isobutene. Butane and isobutane remain pracitcally unchanged under the reaction conditions and isobutene is burnt. Even considerable amounts of isobutene are not troublesome. The above-mentioned hydrocarbon fractions may also contain small amounts, for example 0.1 to 10% by weight of aliphatic saturated and olefinically unsaturated hydrocarbons containing more than four, for example five or six, carbon atoms.

The oxygen-containing gas used advantageously is a mixture of oxygen and nitrogen containing more than 1 mole percent of oxygen. Pure oxygen may also be used.

The new catalysts according to the invention contain as active ingredients vanadium pentoxide $V_2O_5$, optionally tungsten trioxide $WO_3$, phosphorus pentoxide $P_2O_5$, at least one oxide of the metals copper, silver chromium, manganese, iron, cobalt or nickel and if desired an inert catalyst carrier.

The catalyst should contain 1 to 30%, preferably 2 to 20%, by weight of vanadium pentoxide, if desired up to 25%, in general 0.1 to 25%, preferably up to 10%, by weight of tungsten trioxide and 5 to 70%, preferably 10 to 60%, by weight of phosphorus pentoxide. Catalysts which contain more than 2, preferably 3 to 50, moles of phosphorus pentoxide per mole of vanadium pentoxide have special advantages.

The catalyst should have a content of 4 to 90%, preferably 4 to 60% by weight of an oxide of copper, silver, chromium, manganese, iron, cobalt or nickel. Oxides of the metals nickel, chromium, iron or cobalt may be used with particular advantage. Obviously mixtures of the said oxides may also be used. The percentages refer in each case to the whole catalyst, irrespective of whether it is a supported or unsupported catalyst. The percentages refer to values determined analytically and give no information as to the state of combination. The oxides may not be present in the finished catalyst as such, but rather at least partly in chemical combination with the other components of the catalyst. They are then mainly present as phosphates, i.e. orthophosphates, pyrophosphates or metaphosphates of the metals. The surprising property of the new catalysts of not giving up any phosphoric acid even after prolonged periods of operation is presumably attributable to the thermal stability of such metal phosphates.

The catalysts exhibit particularly high activity when practically the whole of the metal oxide is present in the form of phosphates. The catalysts should preferably contain at least one mole of phosphorus pentoxide per mole of metal oxide.

In addition to the active ingredients, the new catalysts may contain up to 90%, in general 5 to 90%, preferably up to 75% of an inert carrier. Suitable carriers are for example aluminum oxide, zinc oxide, porcelain, pumice, diatomaceous earth, silicon carbide, silicic acid gel, zirconium dioxide and particularly titanium dioxide.

The catalysts are prepared by conventional methods for example by mixing vanadium compounds and if desired compounds containing tungsten which are converted by heating into $V_2O_5$ and $WO_3$ respectively, or by mixing the oxides themselves, advantageously in aqueous solution or suspension, with a phosphorus compound and with the oxide or oxides of metals of copper, silver, chromium, manganese, iron, cobalt or nickel or a compound or compounds of these metals which are converted into the oxide by heating, and if desired with the inert carrier, with or without the addition of a binder, and shaping the composition by a conventional method into pellets, spheres or strands and then drying them at elevated temperature, for example at 100° to 300° C.

Examples of vanadium, phosphorus and tungsten compounds which are suitable for the preparation of the catalyst are ammonium vanadate, vanadium (IV) oxalate, formate, acetate, tartrate, salicylate or other organic complex compounds of vanadium, tungstic acid, phosphotungstic acid or particularly solutions of tungstic acid in amines, such as ethanolamine, methylamine, diethylamine, trimethylamine, piperidine, if desired with the addition of water, as well as phosphorus pentoxide, phosphoric acid, pyrophosphoric acid, phosphorus acid, ammonium phosphate or esters of phosphoric acid or of phosphorous acid.

Examples of suitable compounds of copper, silver, chromium, manganese, iron, cobalt and nickel are the formates, acetates, oxaloates, salicylates or salts of other organic acids, the hydroxides and the carbonates. Obviously compounds of the metals with the other catalyst components, such as vanadates, tungstates and particularly phosphates, acid phosphates, pyrophosphates or metaphosphates, may be used.

The finished catalyst is most effective when the internal surface area is from 1 to 100 sq. m./g., particularly from 4 to 20 sq. m./g. This range may easily be set up in practice by appropriate choice of the catalyst components and of any carrier used for the catalyst and/or by annealing the finished catalyst. The catalysts are in general heated for from two to twelve hours at 300° to 500° C.

The optimum ratio of the catalyst components to each other and the optimum internal surface area of the catalyst may easily be determined by experiment.

The catalysts often exhibit optimum activity only after operation for some hours. To achieve good yields during the start-up period as well, it is advantageous, prior to the actual reaction or during oxidation, to add to the catalyst an extra amount of phosphoric acid, for example 2 to 10% of the amount contained in the catalyst. During the first hours of operation this excess phosphoric acid is removed from the catalyst again with the reaction gas.

Oxidation is carried out at temperatures of from 300° to 500° C., particularly from 350° to 450° C. The temperature in the layer of catalyst is not generally isothermal. The process is usually carried out at atmospheric pressure or at slightly superatmospheric pressure, for example up to 5 atmospheres gauge.

The reaction is carried out in the conventional way for catalytic gas phase reactions. For example the gas containing oxygen and the hydrocarbon to be oxidized may be premixed so that a gas mixture is obtained which contains not more than 5% by volume, preferably 0.5 to 2% by volume, of the hydrocarbon to be oxidized, and the mixture is passed into a vertical reactor of steel or stainless steel which may be lined with tantalum or titanium and in which the catalyst is stationary. The reaction vessel is surrounded by a bath of molten saltpetre to remove the reaction heat.

Reaction may also be carried out in a fluidized bed, the gas mixture being passed into the layer of catalyst in such a way that the particles of catalyst are fluidized.

The hot reaction gas leaving the reactor is first cooled indirectly to about 80° C. and then supplied to a water scrubber in which the maleic anhydride is removed from the reaction gas. The content of carbon dioxide and carbon monoxide may be determined in the off-gas in continuous analysers to calculate the selectivity. The wash water containing maleic acid is evaporated under subatmospheric pressure and the remaining maleic acid is separated. Part of the maleic anhydride formed may however be deposited in solid or liquid form according to the partial pressure by cooling the hot reaction gas and only the remainder can be recovered via a water scrubber.

The invention is illustrated by the following examples.

EXAMPLE 1

40.7 g. of nickel phosphate ($+7H_2O$) is dissolved in 100 g. of 85% phosphoric acid and 30 cc. of water and the whole is then combined with a solution of 11 g. of tungstic acid in 10 g. of ethanolamine and 3 cc. of water. A solution of 78 g. of vanadyl oxalate in 70 g. of formamide and 40 cc. of water which has been prepared at 120° C. is added to the said mixture and kneaded to a thick paste with 300 g. of anatase in a kneading machine. The composition is shaped into cylindrical pellets by means of a perforated plate; after they have been dried at 200° C. and heated for twelve hours at 450° C. in a muffle furnace, they have a height and diameter of 5 mm. The catalyst has a composition of: 8.1% $V_2O_5$; 2.5% $WO_3$; 4.5% NiO; 11.9% $P_2O_5$ and 73% $TiO_2$.

300 cc. of this catalyst is placed in a tube which has an internal width of 25 mm. and which is heated in a salt bath. Then 1200 liters of air and 29.3 g. of a butene fraction containing 80% of n-butenes in addition to butane are passed per hour through the catalyst at 450°

C. The acids formed are absorbed by scrubbing with water. 25.5 g. of maleic acid is obtained per hour in addition to 2.0 g. of aliphatic monocarboxylic acids. The yield by weight of maleic acid is 118.3% on pure butene, equivalent to 57.2% of the theory.

An analogous result is obtained when the catalyst is prepared without the use of tungstic acid.

EXAMPLE 2

The catalyst mixture of Example 1 is modified by replacing the nickel phosphate by 42.2 g. of cobalt phosphate ($+8H_2O$) but otherwise prepared in the same way. The resultant catalyst contains: 68.6% $TiO_2$; 4.3% CoO; 4.7% $V_2O_5$; 2.3% $WO_3$ and 16.9% $P_2O_5$.

Under the same reaction conditions as in Example 1 and with the same starting material this catalyst yields 25.4 g. of maleic acid and 1.8 g. of lower acids per hour. The yield by weight of maleic acid, with reference to pure butene, is 119%, equivalent to 57.4% of the theory.

EXAMPLE 3

The catalyst of Example 1 is modified by replacing the nickel phosphate by 63 g. of chromium phosphate ($+6H_2O$). The catalyst obtained contains: 7.6% $V_2O_5$; 2.3% $WO_3$; 4.3% $Cr_2O_3$; 18% $P_2O_5$ and 67.8% $TiO_2$.

25.7 g. of maleic acid and 1.6 g. of lower acids are obtained per hour at 430° C. under the same conditions as in Example 1 from 29.3% of an 80% butene fraction. With reference to pure butene, the yield by weight of maleic acid is 121%, equivalent to 58.4% of the theory.

EXAMPLE 4

A mixture of 360 g. of anatase and 840 g. of ferrous phosphate ($+8H_2O$) is kneaded with a solution of 44 g. of tungstic acid in 40 g. of ethanol and 10 cc. of water and a solution of 312 g. of vanadium oxalate in 520 g. of formamide and 200 cc. of water prepared at 100° C., to form a paste. A mixture of 928 g. of 85% phosphoric acid and 300 cc. of water is added. The composition which forms with evolution of heat is shaped, dried and heated in a muffle furnace as described in Example 1. The catalyst has the following composition: 7.6% $V_2O$; 2.3% $WO_3$; 23.0% $Fe_2O_3$; 46.5% $P_2O_5$ and 20.6% $TiO_2$.

1200 liters of air and 29.3 g. of a gas mixture containing 80% of n-butenes as well as butane are passed per hour over 300 cc. of the said catalyst at 490° C. In addition to 1.3 g. of lower aliphatic acids, 26.6 g. of maleic acid is obtained per hour. The yield by weight of maleic acid (with reference to reacted n-butenes) is 123.8%, equivalent to 59.9% of the theory.

EXAMPLE 5

190 g. of anhydrous ferric phosphate is mixed intimately with 90 g. of anatase. A hot solution of 78 g. of vanadyl oxalate in 130 g. of formamide and 100 g. of water and a hot solution of 11 g. of tungstic acid, 10 g. of ethanolamine and 3 g. of water are added to the said mixture with stirring. After 232 g. of 85% phosphoric acid has been added, a paste is formed with the formation of heat and this is shaped by means of perforated plates. The pellets obtained are dried at 130° C. and heated in a muffle furnace at 450° C. for six hours. The catalyst has the following composition: 7.2% of $V_2O_5$; 2.2% of $WO_3$; 21.5% of $Fe_2O_3$; 49.8% of $P_2O_5$ and 19.3% of $TiO_2$.

1200 liters of air and 39 g. of a gas mixture containing 88% of n-butenes as well as butane are passed per hour at 490° C. over 300 cc. of the said catalyst. The reaction mixture contains 2.4 g. of unreacted n-butenes. In addition to 1.3 g. of lower partly unsaturated fatty acids, 36.2 g. of maleic acid is obtained. The yield is 61.4% of the theory on reacted n-butenes. The yield by weight is 127%.

We claim:
1. In a process for the production of maleic anhydride by catalytic oxidation in the gas phase of an olefinically unsaturated aliphatic hydrocarbon having four carbon atoms in a linear molecular chain with a gas consisting of or containing free oxygen and at a temperature of about 300° C. to 500° C., the improvement which comprises: carrying out said oxidation in the presence of a catalyst containing
    (a) 1 to 30% by weight of $V_2O_5$,
    (b) 5 to 70% by weight of $P_2O_5$,
    (c) 5 to 90% by weight of an inert carrier, and
    (d) 4 to 90% by weight of an oxide of at least one metal selected from the group consisting of chromium, iron, cobalt and nickel,
the amount of $P_2O_5$ being at least one mole per mole of the metal oxide component (d) and at least two moles per mole of $V_2O_5$.

2. A process as claimed in claim 1 wherein said catalyst contains up to 25% by weight of $WO_3$.

3. A process as claimed in claim 1 wherein said catalyst contains $TiO_2$ as the inert carrier.

4. A process as claimed in claim 1 wherein said catalyst has an internal surface area of 1 to 100 sq. m./g.

5. A process as claimed in claim 1 wherein the molar amount of $P_2O_5$ in said catalyst is 3 to 50 moles per mole of $V_2O_5$.

6. A process as claimed in claim 1 wherein said catalyst consists essentially of:
    (a) 2 to 20% by weight of $V_2O_5$;
    (b) 10 to 60% by weight of $P_2O_5$;
    (c) 5 to 75% by weight of $TiO_2$;
    (d) 4 to 60% by weight of NiO; and
    (e) 0.1 to 10% by weight of $WO_3$.

7. A process as claimed in claim 1 wherein said catalyst consists essentially of:
    (a) 2 to 20% by weight of $V_2O_5$;
    (b) 10 to 60% by weight of $P_2O_5$;
    (c) 5 to 75% by weight of $TiO_2$;
    (d) 4 to 60% by weight of CoO; and
    (e) 0.1 to 10% by weight of $WO_3$.

8. A process as claimed in claim 1 wherein said catalyst consists essentially of:
    (a) 2 to 20% by weight of $V_2O_5$;
    (b) 10 to 60% by weight of $P_2O_5$;
    (c) 5 to 75% by weight of $TiO_2$;
    (d) 4 to 60% by weight of $Cr_2O_3$; and
    (e) 0.1 to 10% by weight of $WO_3$.

9. A process as claimed in claim 1 wherein said catalyst consists essentially of:
    (a) 2 to 20% by weight of $V_2O_5$;
    (b) 10 to 60% by weight of $P_2O_5$;
    (c) 5 to 75% by weight of $TiO_2$;
    (d) 4 to 60% by weight of $Fe_2O_3$; and
    (e) 0.1 to 10% by weight of $WO_3$.

References Cited

UNITED STATES PATENTS 3,156,705  11/1964  Kerr _____ 260—346.8
3,255,213  6/1966  Kerr _____ 260—346.8

FOREIGN PATENTS 692,731  8/1964  Canada.

ALEX MAZEL, Primary Examiner
B. I. DENTZ, Assistant Examiner

U.S. Cl. X.R.
252—435